J. AND J. G. GRAY.
GYROSCOPIC APPARATUS.
APPLICATION FILED OCT. 14, 1918.
1,310,862.
Patented July 22, 1919.
2 SHEETS—SHEET 1.
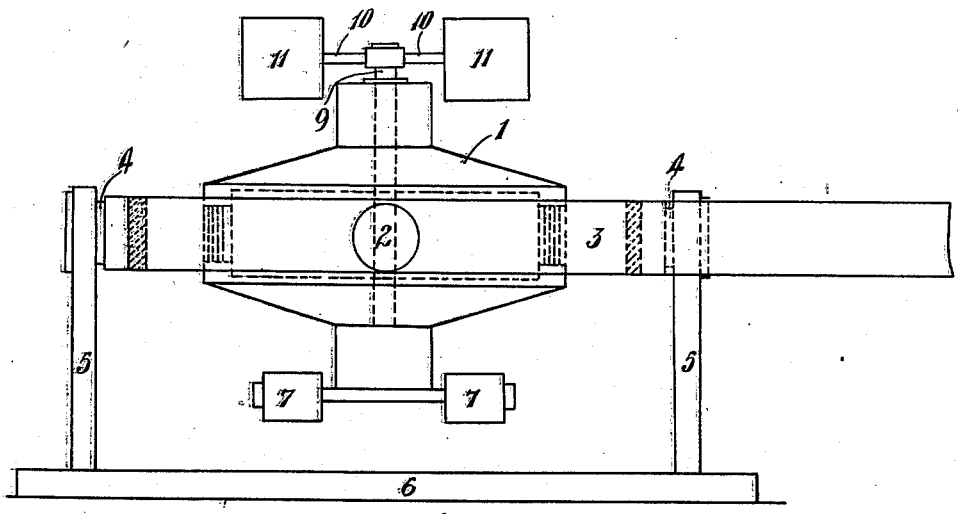
Fig. 1.
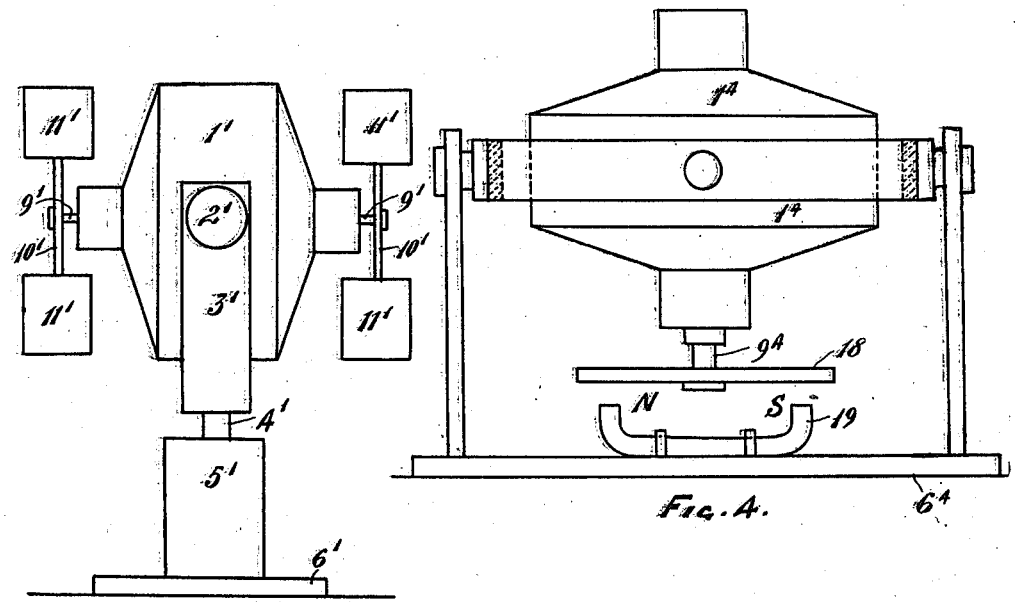
Fig. 2.
Fig. 4.
Inventors:
John Gray
James Gordon Gray
by Calver & Calver,
Attorneys

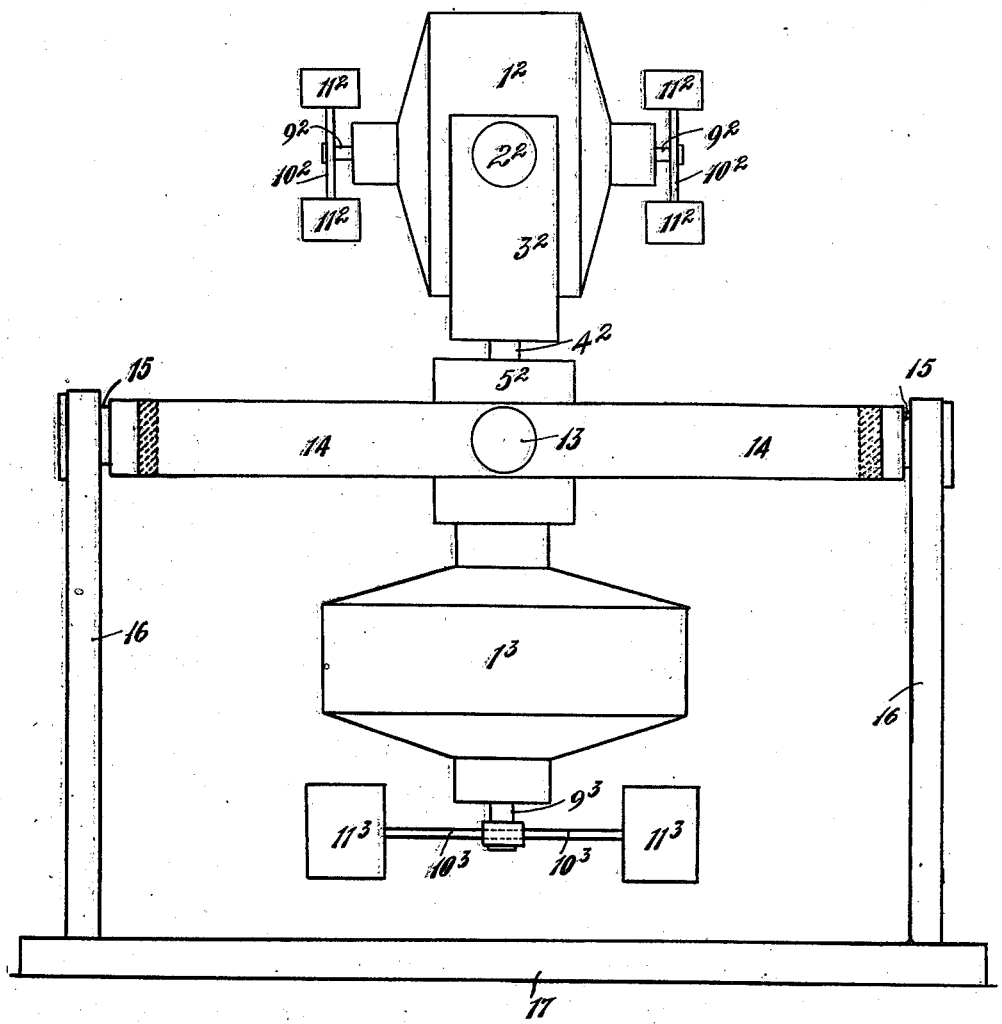

UNITED STATES PATENT OFFICE.

JOHN GRAY, OF LONDON, ENGLAND, AND JAMES GORDON GRAY, OF GLASGOW, SCOTLAND.

GYROSCOPIC APPARATUS.

1,310,862.   Specification of Letters Patent.   Patented July 22, 1919.

Application filed October 14, 1918. Serial No. 258,125.

*To all whom it may concern:*

Be it known that we, JOHN GRAY and JAMES GORDON GRAY, subjects of the King of the United Kingdom of Great Britain and Ireland, and residing at London, England, and Glasgow, Scotland, respectively, have invented a certain new and useful Improvement in Gyroscopic Apparatus, of which the following is a specification.

This invention relates to gyroscopic stabilizers and steering apparatus for use on moving bodies such as aeroplanes and battleships for example.

In the accompanying drawings Figures 1 and 2 are side elevations showing two simple embodiments of the invention. Fig. 3 is an elevation showing a modification of wider application. Fig. 4 shows a further modification.

Referring to Fig. 1, a gyroscope casing 1 is gimbaled as at 2 to a frame 3, which frame is in turn gimbaled at 4, 4 to two uprights 5, 5 rigidly attached to a base 6 carried by the moving body. The spindle 9 of the gyroscope flywheel is extended upwardly through the casing 1 and carries a boss having two or more radial arms 10, 10. Attached to the free ends of these arms are vanes 11, 11. Depending from the casing 1 is a set of weights 7, by adjustment of which the weight of the pivoted system can be so distributed that when the axis of the spindle 9 is vertical the center of gravity of said system lies slightly below the intersection of the gimbal axes.

When the spindle 9 is rotating, the vanes 11, 11 are forcibly rotated in the air, and a couple or torque is applied to the casing 1 in a plane parallel to that in which the flywheel is spinning, the sense or direction of which couple is opposite to that of the spin of the flywheel. In these circumstances, the gyroscopic system is stabilized into the vertical. If the axis of the spindle 9 becomes inclined to the vertical, the couple applied to the casing 1 by the passage of the vanes at high speed through the air is resolved into two components, one vertical and the other horizontal, and the horizontal component retards the precessional motion of the gyroscope. Thus if the gyroscope be tilted about the axis of the pivots 2, the reaction couple has a component whose axis lies along the line of the pivots 4, 4, and whose direction is such that the axis of the spindle 9 tends to the vertical.

If the apparatus be adjusted so that the center of gravity of the pivoted system lies at the intersection of the gimbal axes, then the equilibrium position of the gyroscope is one in which the axis of the spindle 9 is perpendicular to the gimbal axes. Thus, if the base 6 be tilted so as to incline the axis 4, 4, the casing 1 will come to rest with the axis of the spindle 9 perpendicular to the axis 4, 4. When the pivoted system is provided with gravitational stability, as already explained, the equilibrium position of the gyroscope, when the axis 4, 4 is tilted out of the horizontal, is one in which the axis of the spindle 9 is slightly inclined to the vertical, the amount of such inclination depending on the magnitude of the torque applied by the vanes, and on the amount of the gravitational stability.

It has been assumed that the couple applied to the casing 1 is in a plane perpendicular to the axis of the spindle. If the vanes be spun in a plane inclined to the axis of the spindle 9, then, supposing the center of gravity of the pivoted system to lie at the intersection of the gimbal axes, the equilibrium position of the !arrangement will be one in which the axis of the torque applied by the vanes to the casing is perpendicular to the gimbal axes. It is preferable, however, to rotate the vanes in a plane parallel to the plane of rotation of the gyroscope flywheel.

In Fig. 2 is shown a modification in which a reaction torque applied to the casing 1' of a gyroscope is employed to maintain the gyroscope with its axis horizontal. The spindle of the flywheel is extended beyond the casing at 9', 9', the extensions carrying radial arms 10', 10', to which are attached systems of vanes 11', 11'. These vanes are so arranged that there is applied to the casing 1' a reaction torque or couple the sense of which is opposed to the direction of spin of the flywheel of the gyroscope. The casing 1' of the gyroscope is pivoted at 2' to a fork 3' and this fork is carried on a spindle 4' mounted in a pedestal bearing 5' attached to the base 6'. If the center of gravity of the gyroscope, its casing, etc., lies at the intersection of the axes of the pivots 2' and 4', the equilibrium position of the gyroscope will be one in which the axis of the flywheel spindle is perpendicular to the axis 4'. If the axis of the flywheel spindle becomes inclined to the horizontal (supposing the axis 4' maintained vertical) the reaction couple has a component about the axis 4' and the direction of this component is such as to bring the axis of the flywheel spindle into the horizontal. Thus, if the pedestal bearing 5' be maintained vertical, the axis of the gyroscope is maintained horizontal.

This apparatus is of importance as a direction pointer for use on aircraft and as a gyroscopic steering device. The base 6' is attached to the aeroplane or other moving body. It will be seen that if the aeroplane turn in azimuth, carrying with it the bearing 5', the gyroscope maintains the direction of its axis in space unchanged.

If the center of gravity of the gyroscope and its casing lie vertically below the axis of the pivots 2' when the axis of the flywheel spindle is horizontal, the device becomes a gyroscopic compass. If the axis of the flywheel spindle be not in the meridian, the rotation of the earth brings about tilting of the axis, and this tilt (since the gyroscope is provided with gravity control) causes precession on the bearing 5', which precession brings the axis of the flywheel spindle toward the meridian. At the same time the precessional motion on the bearing 5' is retarded by a component of the reaction couple due to the vanes. Thus, the gyroscope oscillates to and fro about the meridian in diminishing amplitude, and finally comes to rest with its axis north and south.

A disadvantage of the apparatus shown in Fig. 2 lies in the fact that when it is fitted on a moving body the bearing 5' is not maintained vertical; pitching and rolling motions of the body cause the axis 4' to deviate from the vertical, and affect the gyroscope. Fig. 3 shows the invention in a more complete form with this defect removed. A gyroscope casing $1^2$ is mounted with its axis horizontal on horizontal pivots $2^2$ carried by a fork $3^2$. This fork $3^2$ is carried by a spindle $4^2$, which is mounted freely in a pedestal bearing $5^2$, or the equivalent. The spindle of the flywheel is extended at $9^2$, $9^2$, and the extensions carry arms $10^2$, $10^2$ to which are attached systems of vanes $11^2$, $11^2$. Rigidly attached below the bearing $5^2$ is a second gyroscope casing $1^3$, the axis of which is vertical. The spindle of the second gyroscope is extended at $9^3$ and carries transverse arms $10^3$ to which are attached vanes $11^3$ as shown. It will thus be seen that the fork $3^2$, the bearing $5^2$ and the casing $1^3$ form a rigid system. This system is gimbaled as at 13 to a frame 14, which is in turn gimbaled at 15, 15 to uprights 16, 16 carried by a base 17 attached to the moving body.

The system pivoted at 13 and 15 is given a certain amount of gravity control; that is, the center of gravity of the said system lies slightly below the intersection of the pivots 13 and 15 when the system is upright. When the flywheel of the gyroscope $1^3$ is spinning, and consequently the vanes $11^3$ are rotating in the air, the system is stabilized into the vertical. If the center of gravity of the gyroscope $1^2$ lie at the intersection of the lines of the pivots $2^2$, $4^2$, the axis of the gyroscope $1^2$ is stabilized into the horizontal, when the flywheel of the gyroscope $1^2$ is spinning, by the torque applied to the casing 1 due to the rotation in the air of the vanes $11^2$. Since the bearing $5^2$ forms part of the main pivoted system, it is always maintained vertical, and there is no disturbance of the gyroscope $1^2$ due to inclination to the vertical of the pivot $4^2$. The main pivoted system, that is, the system pivoted at 13, 15, is available to indicate the vertical on a moving body, and the gyroscope $1^2$ is available for steering purposes and as a direction pointer.

If the center of gravity of the gyroscope $1^2$ lie below the axis of the pivots $2^2$ when the axis of the gyroscope $1^2$ is horizontal, the device becomes a gyroscopic compass, as already explained, in which the meridian-finding gyroscope $1^2$ is protected from errors due to rolling and pitching of the moving body on which it is mounted by a main stabilizing gyroscope $1^3$.

In the described embodiments of the invention the stabilizing torques applied to the casings of the gyroscopes are obtained by forcibly rotating vanes attached to the spindles of the flywheels. In Fig. 4 is shown an embodiment in which the stabilizing torque is obtained by rotating a conducting disk in the neighborhood of a magnet. The construction of the apparatus is similar to that illustrated in Fig. 1. The spindle of the gyroscope $1^4$ is extended at $9^4$ and carries a disk 18 of metal of high electrical conductivity. Attached to the base $6^4$ is a magnet 19 so arranged that its north and south poles lie close to the disk 18. When the disk 18 is rotated in the direction of spin of the gyroscope spindle, a torque is applied to the casing $1^4$, the sense or direction of which torque is opposite to that of the spin, and this torque stabilizes the gyroscope into the vertical. The torque is produced, of course, by the production of eddy currents in the disk 18 by its motion relatively to the magnet 19.

It will readily be seen that the stabilizing torques may be obtained by providing separate drives for the systems of vanes or for the disk of Fig. 4. Thus, the vanes or disks might be driven by small electric motors, or, where turbine gyroscopes are employed, by small separate turbines. The gyroscopes employed may, of course, be of any convenient type.

The system of vanes and the conducting disk may be regarded as brakes the resistance to rotation of which imposes on the gyroscope casing a torque the sense of which is opposed to the direction of spin of the gyroscope.

What we claim is:—

1. The hereindescribed gyroscopic apparatus comprising, in combination, a gyroscope casing, a spindle journaled for rotation within said casing, and a brake rotatable in the same circular direction as said spindle and adapted to exercise on said casing a torque the sense of which is opposite to that of rotation of said spindle.

2. The hereindescribed gyroscopic apparatus, comprising, in combination, a pivoted frame member, a gyroscope casing pivoted to said frame member, the pivots of said casing and said frame member being at right angles to one another, a rotatable spindle journaled within said casing, and a brake carried by said spindle and adapted to exercise on said casing a torque the sense of which is opposite to that of rotation of said spindle.

3. In a gyroscopic apparatus of the type described, means for stabilizing a gyroscope with reference to trunnion axes, consisting of a brake composed of vanes rotating in air, such rotation resulting in the application of a torque or couple to the gyroscope casing, such torque or couple being opposed in sense to that of the spin of the flywheel.

4. In a gyroscopic apparatus, the combination with a suitable support, of two gyroscopes mounted to rotate in planes at right angles to each other and both having pivotal connections at right angles to each other with said support, and braking means for applying torque to said gyroscopes.

In testimony whereof we have signed our names to this specification in the presence of two subscribing witnesses.

JOHN GRAY.
JAMES GORDON GRAY.

Witnesses:
HENRY MASON,
FLORENCE HOUSTON.